United States Patent [19]

Yoshizawa

[11] Patent Number: 4,501,359
[45] Date of Patent: Feb. 26, 1985

[54] CASING FOR A VIDEO TAPE CASSETTE

[75] Inventor: Keiichi Yoshizawa, Tokyo, Japan

[73] Assignee: TDK Corporation, Tokyo, Japan

[21] Appl. No.: 501,116

[22] Filed: Jun. 6, 1983

[30] Foreign Application Priority Data

Jun. 7, 1982 [JP] Japan .............................. 57-84470[U]

[51] Int. Cl.³ ...................... B65D 85/67; B65D 27/04
[52] U.S. Cl. ................................... 206/387; 206/45.34
[58] Field of Search ................. 206/387, 45.31, 45.34, 206/0.82, 0.83; 229/9, 19

[56] References Cited

U.S. PATENT DOCUMENTS

| 2,314,721 | 3/1943 | Lowenstein | 229/9 |
| 2,457,998 | 1/1949 | Hayes et al. | 206/0.83 |
| 2,597,227 | 5/1952 | Colliton | 206/0.82 |
| 3,587,837 | 6/1971 | Smith et al. | 206/45.34 |

Primary Examiner—William T. Dixson, Jr.
Attorney, Agent, or Firm—Oblon, Fisher, Spivak, McClelland & Maier

[57] ABSTRACT

A casing for a video tape cassette having a window on one surface, through which a note on the cassette half of the video tape cassette received in the casing can be observed, characterized in that a transparent film cover is attached to the back side of the window, said film cover being located in a plane slightly lower than the plane of the surface of the casing.

4 Claims, 9 Drawing Figures

FIGURE 4
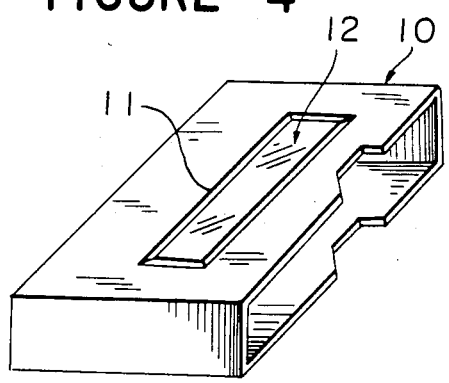
FIGURE 5A
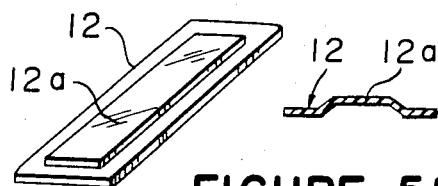
FIGURE 5B
FIGURE 6
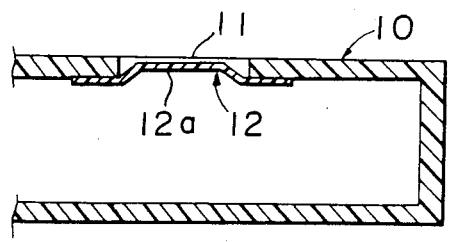
FIGURE 7
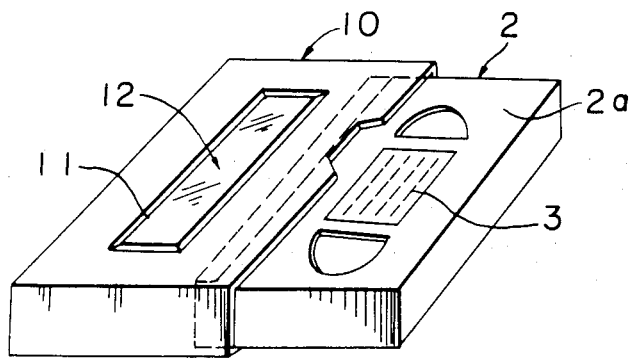

CASING FOR A VIDEO TAPE CASSETTE

The present invention relates to a casing for a video tape cassette. More particularly, it relates to a casing for a video tape cassette having a window, whereby a note printed or written on the cassette accommodated in the casing can readily be observed without taking out the tape cassette from the casing.

It has been common that as shown in FIG. 1, a video tape cassette is accommodated in a casing 1 made of paper or a soft plastic sheet such as a polypropylene sheet, whereby a note on the tape cassette 2 cannot be observed from the outside. Therefore, it used to be required to take a trouble of taking out the cassette from the casing to see the note printed or written on a label 3 attached on the cassette half 2 of the cassette 2, or observing the note printed or written on a back side label 4 attached to the back surface of the tape cassette 2.

It has been proposed to make the same note as the note on the tape cassette 2, on the front surface 1a or the back surface 1b of the casing 1, or to attach labels 3 and 4 with the same note to the casing. However, if the casing 1 is made of a plastic material such as polypropylene, it is difficult to write a note directly thereon, or it is difficult to attach labels 3 and 4 with a usual adhesive and accordingly special labels coated with an adhesive having strong adhesion are required for that purpose.

In order to overcome the above difficulties, it has been proposed to provide a window 6 on the surface of a casing 5 for a video tape cassette as illustrated in FIGS. 2, 3A and 3B, whereby a transparent protective sheet 7 such as a cellophane sheet or a plastic film is attached on the front or back side of the window, so that a note on the surface of the tape cassette can readily be observed. However, in such a conventional construction, if the protective sheet 7 is attached to the front side of the window 6 as illustrated in FIG. 3A, it is likely that the protective sheet 7 is damaged by abrasion or friction when such casings are piled or otherwise handled, whereby it becomes difficult to see the note on the tape cassette through the protective sheet. If the protective sheet 7 is attached to the back side of the window 6 as illustrated in FIG. 3B, the protective sheet 7 is likely to be damaged by the engagement with the tape cassette when the latter is inserted into or withdrawn from the casing. An improvement to overcome these drawbacks has been desired.

Accordingly, it is an object of the present invention to overcome the above mentioned difficulties and to provide a casing for a diveo tape cassette having on its body a window through which a note on the surface of the cassette half can readily be observed, wherein a protective sheet is attached to the window in such a manner that it is not damaged even when such casings are piled or when the tape cassette is inserted into or withdrawn from the casing.

Namely, the present invention provides a casing for a video tape cassette having a window on one surface, through which a note on the cassette half of the video tape cassette received in the casing can be observed, characterized in that a transparent film cover is attached to the back side of the window, said film cover being located in a plane slightly lower than the plane of the surface of the casing.

Now, the present invention will be described in detail with reference to the accompanying drawings.

FIG. 4 is a perspective view of a casing for a video tape cassette according to the present invention.

FIG. 5A is a perspective view of a transparent film cover for the casing of the present invention.

FIG. 5B is a cross sectional view of the transparent film cover.

FIG. 6 is an enlarged cross sectional view of the main portion of the casing of the present invention, illustrating the manner in which the transparent film cover is attached to the window of the casing.

FIG. 7 is a perspective view illustrating the manner of inserting a tape cassette into the casing of the present invention.

Figure 1:
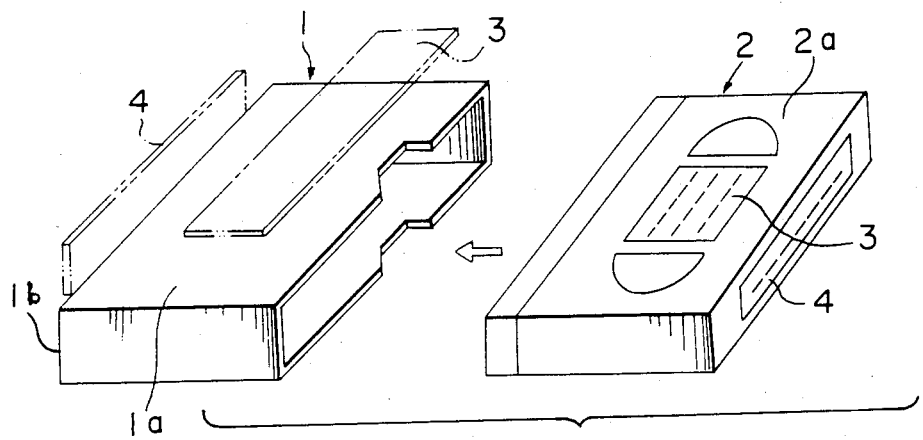
FIG. 1 is a perspective view of a conventional casing for a video tape cassette.
Figure 2:
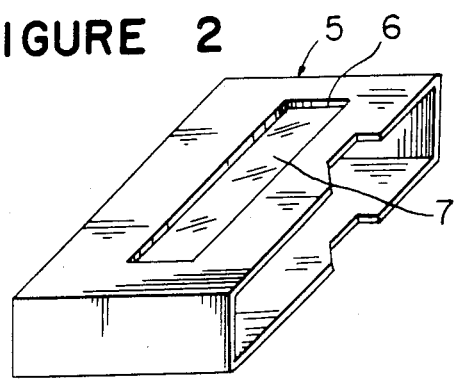
FIG. 2 is a perspective view of another conventional casing for a video tape cassette.
Figures 3A, 3B:
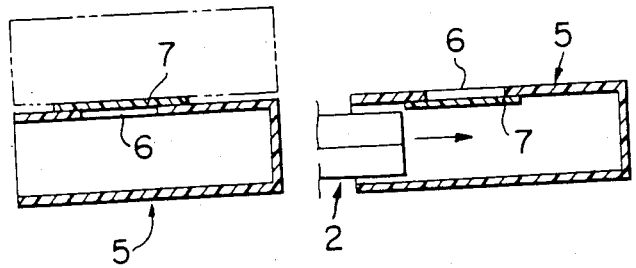
FIGS. 3A and 3B are cross sectional views of conventional casings similar to the one illustrated in FIG. 2.

A prefered embodiment of the present invention will be described in detail with reference to FIGS. 4 to 7. FIG. 4 is a perspective view of a casing 10 for a video tape cassette according to the present invention. A window 11 having a sufficient size so that a label 3 attached on the surface of a tape cassette 2 can be observed therethrough, is provided on one surface of the casing in which the tape cassette 2 is accomodated.

A transparent film cover 12 is attached to the back side of the window 11.

The film cover 12 prevents a dust from entering through the window 11 of the casing 10 for a video tape cassette and thereby protects the label 3 of the tape cassette from staining. The film cover is made of e.g. a transparent plastic sheet or a transparent film. As shown in FIGS. 5A and 5B, the cover 12 has an embossed portion 12a formed by a proper molding method such as press molding, vacuum molding or compressed air molding and corresponding to and fitting in the window 11 of the casing 10.

The embossed portion 12a of the cover 12 has a height slightly lower than the plane of the surface of the casing 10. When the cover is attached to the back side of the window 11, the surface of the embossed portion 12a is in a plane lower than the plane of the surface of the casing 10. For instance, when the thickness of the casing 10 is 1.0 mm, the height of the embossed portion 12a of the cover 12 should preferably be at most 0.8 mm. Namely, the height of the embossed portion should preferably correspond to at most 80% of the wall thickness of the casing.

Further, as shown in FIGS. 5B and 6, the periphery of the embossed portion 12a may be outwardly tapered so that when attached to the back side of the window 11, the film cover presents an appealing design along the tapered peripheral portion as shown in FIGS. 4 and 7.

Thus, when the tape cassette 2 is to be accommodated in the casing 10 having the above mentioned construction as illustrated in FIG. 7, the tape cassette can smoothly be inserted into or withdrawn from the casing. The label 3 attached to the tape cassette 2 can readily be observed through the transparent film cover 12 attached to the window 11 of the casing 10.

Having thus described the invention, it should be understood that according to the video tape cassette casing of the present invention, a note printed or written on the label attached to the surface of the cassette half of the tape cassette accommodated in the casing can readily be seen, whereby it is unnecessary to take a trouble of taking out the tape cassette from the casing to see the note on the tape cassette and it is unnecessary to provide a space for such a note on the body of the casing.

Further, the tape cassette to be accommodated may have a note for the recorded tape only on the surface of the cassette half and it is unnecessary to attach a label to the back side surface of the cassette. Furthermore, it is unnecessary to take a trouble of attaching a label with such a note also to the body of the casing. Thus, with the casing of the present invention, some of the note-making steps may be omitted, which are usually required with the conventional casings for video tape cassettes.

I claim:

1. A videotape cassette and casing combination comprising:
    a videotape cassette having a label on one surface thereof;
    a casing for said videotape cassette, said casing having a face including inner and outer surfaces and a window in said face at a position corresponding to said label when said cassette is introduced into said casing; and
    a transparent film cover for said window, said transparent cover being attached to said inner surface of said casing face and covering said window, said cover being formed so as to extend toward said outer surface such that said cover extends between said inner and outer surfaces.

2. The casing for a video tape cassette according to claim 1, wherein the transparent film cover is made of a transparent plastic sheet or a transparent film.

3. The casing for a video tape cassette according to claim 1, wherein the transparent film cover has an embossed portion corresponding to and fitting in the window of the casing and having a height corresponding to at most 80% of a wall thickness of the casing.

4. The casing for a video tape cassette according to claim 3, wherein a periphery of the embossed portion is outwardly tapered.

* * * * *